(12) United States Patent
Bosco

(10) Patent No.: US 11,880,427 B2
(45) Date of Patent: Jan. 23, 2024

(54) TIME-SERIES DATA PROCESSING METHOD, CORRESPONDING PROCESSING SYSTEM, DEVICE AND COMPUTER PROGRAM PRODUCT

(71) Applicant: STMicroelectronics S.r.l., Agrate Brianza (IT)

(72) Inventor: Angelo Bosco, Giarre (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 826 days.

(21) Appl. No.: 16/998,810

(22) Filed: Aug. 20, 2020

(65) Prior Publication Data
US 2021/0067381 A1   Mar. 4, 2021

(30) Foreign Application Priority Data

Sep. 3, 2019   (IT) .................. 102019000015491

(51) Int. Cl.
| | |
|---|---|
| G06F 17/18 | (2006.01) |
| G06F 18/2321 | (2023.01) |
| G06F 17/16 | (2006.01) |

(52) U.S. Cl.
CPC ............. *G06F 17/18* (2013.01); *G06F 17/16* (2013.01); *G06F 18/2321* (2023.01)

(58) Field of Classification Search
CPC ...... G06F 17/16; G06F 17/18; G06F 18/2321; G06T 2207/20081; G06T 2207/20084; G05B 23/024; G05B 23/0281; G05B 23/0283
See application file for complete search history.

(56) References Cited

U.S. PATENT DOCUMENTS

| | | | | |
|---|---|---|---|---|
| 2020/0387797 | A1* | 12/2020 | Ryan | G06N 3/084 |
| 2022/0016770 | A1* | 1/2022 | Matsuoka | B25J 9/1687 |
| 2022/0051081 | A1* | 2/2022 | Bosco | G06F 17/18 |
| 2022/0155770 | A1* | 5/2022 | Chang | G05B 13/027 |

OTHER PUBLICATIONS

Li, et al,. "Model-Free Information Extraction in Enriched NonLinear Phase-Space," arxiv.org, Cornell University Library, XP081236868, Apr. 14, 2018, 8 pages, Ithica, NY.
Roman Cheplyaka, "Explained variance in PCA", Dec. 11, 2017, 7 pages.

* cited by examiner

*Primary Examiner* — Matthew D Sandifer
(74) *Attorney, Agent, or Firm* — Slater Matsil, LLP

(57) ABSTRACT

An embodiment method of processing at least one sensing signal comprising a time-series of signal samples comprises high-pass filtering the time series of signal samples to produce a filtered time series; applying delay embedding processing to the filtered time series; producing a first matrix by storing the set of time-shifted time series as an ordered list of entries in the first matrix; applying a first truncation to produce a second matrix by truncating the entries in the ordered list of entries at one end of the first matrix to remove a number of items equal to the product of the first delay embedding parameter decreased by one times the second delay embedding parameter; applying entry-wise processing to the second matrix, and forwarding a set of estimated kernel densities and/or a set of images generated as a function of the set of estimated kernel densities to a user circuit.

20 Claims, 6 Drawing Sheets

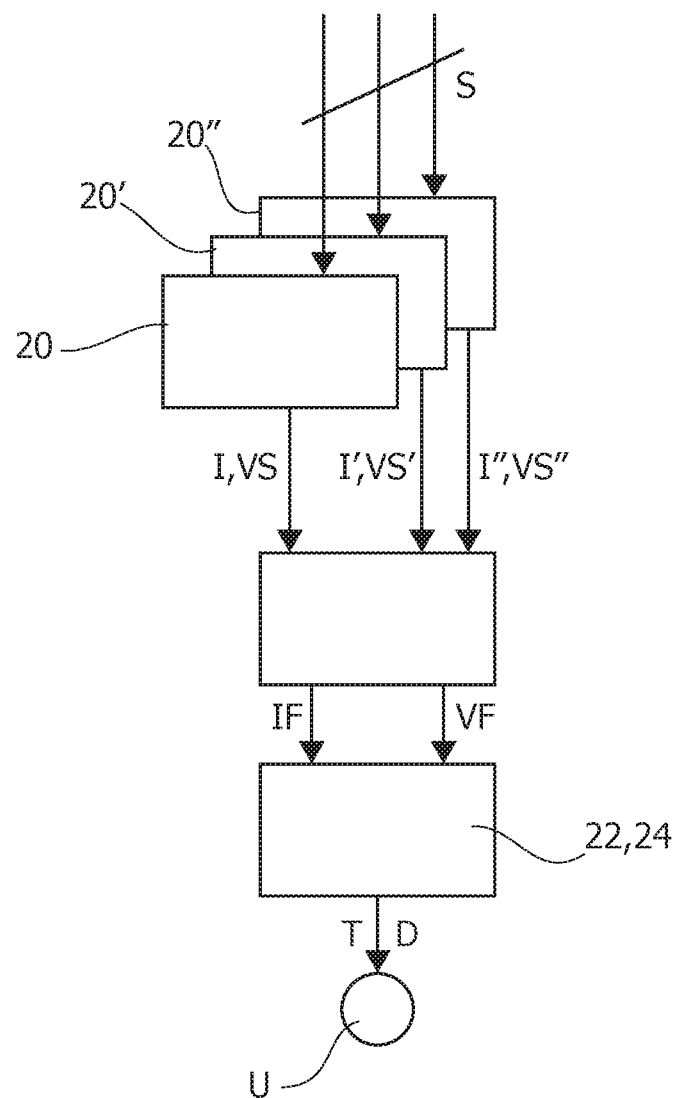

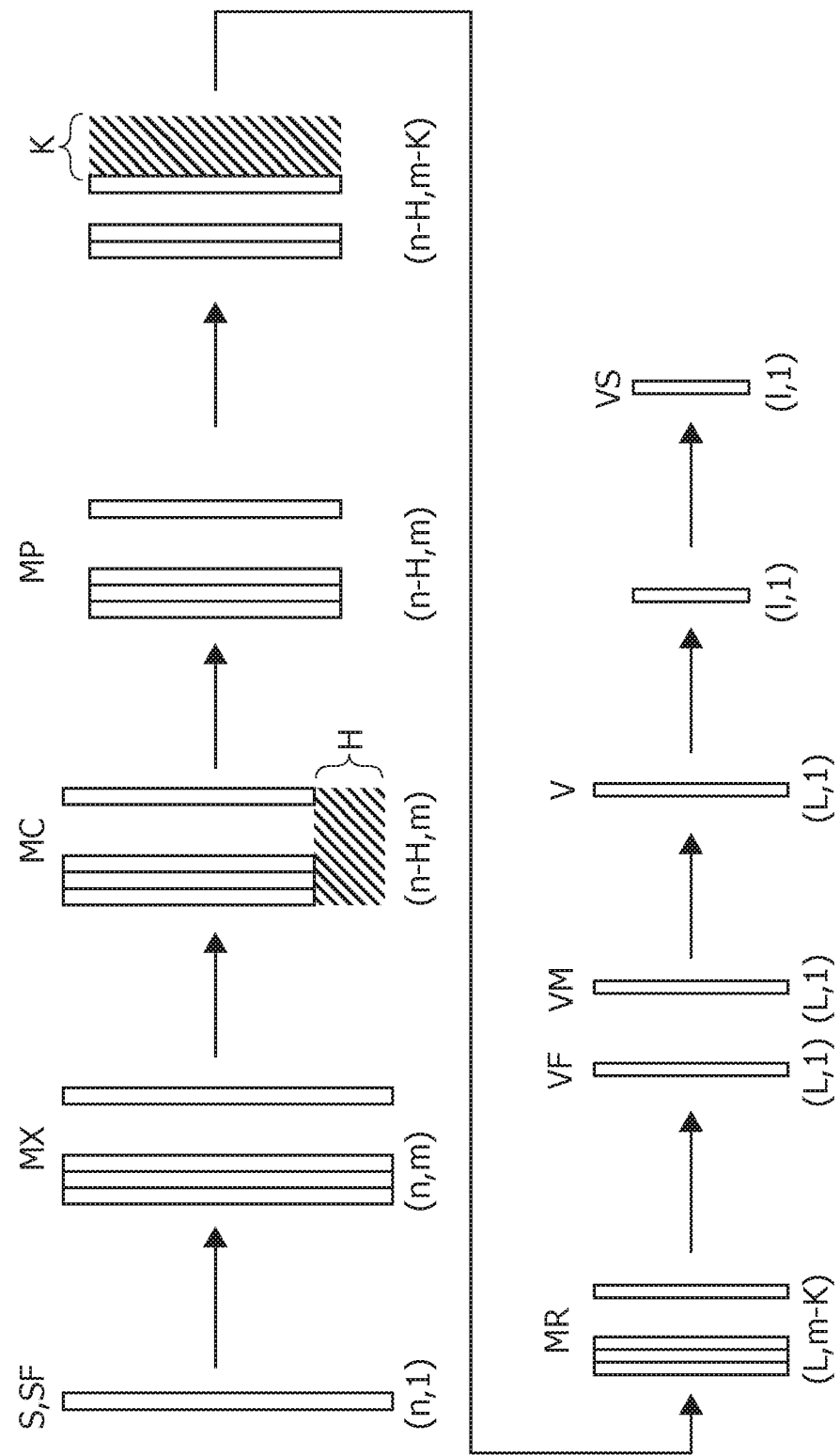

TIME-SERIES DATA PROCESSING METHOD, CORRESPONDING PROCESSING SYSTEM, DEVICE AND COMPUTER PROGRAM PRODUCT

CROSS-REFERENCE TO RELATED APPLICATIONS

This application claims the benefit of Italian Application No. 102019000015491, filed on Sep. 3, 2019, which application is hereby incorporated herein by reference.

TECHNICAL FIELD

The description relates to a data processing method for detecting characteristic signatures of a dynamical system state. One or more embodiments may be applied to processing time-series data sensed via inertial sensors such as accelerometers, e.g., for human activity recognition, gesture recognition or for the characterization of vibrations in motors for predictive maintenance.

BACKGROUND

Monitoring a dynamical system state evolution in time may involve measuring physical parameters of the system via one or more heterogeneous sensors (e.g., inertial sensors, environmental information, video, audio, etc.) coupled to the system, recording time series of data related to the condition or state of the system.

Specifically, in order to measure the state of a periodic or quasi-periodic dynamical system, inertial sensors may be used, such as accelerometers, gyroscopes, pressure sensor, and so on.

In order to obtain information about the underlying dynamical system, signals acquired via sensors may be processed by applying some domain transformation, such as analysis in the Fast Fourier Transform domain.

Such processing may involve heavy and rather cumbersome computations and may not provide data readily interpretable as an indicator of malfunctioning.

For instance, conventional techniques may comprise processing a point cloud data obtained from sensor, whose analysis may hardly be straightforward.

Methods for processing sensor data which use a reduced amount of computational resources and provide improved results are thus desirable.

SUMMARY

An object of one or more embodiments is to contribute in providing such an improved solution.

In many contexts, it may be advantageous to characterize a dynamical system state (e.g., periodic or quasi-periodic) via one or more sensors. For instance, it may be desirable to extract clear indications of the state of a dynamical system therefrom, in order to know whether the dynamical system is operating in a stable or perturbed state.

Tailored sensor data processing may facilitate correcting the dynamical system behavior, e.g., via a remote controller, as a reaction to a detected anomaly in the system. According to one or more embodiments, that object can be achieved by means of a method having the features set forth in the claims that follow.

A data processing method for detecting characteristic signatures of a dynamical system such that analysis can be carried on for classification and anomaly detection may be exemplary of such a method.

One or more embodiments may relate to a corresponding device.

A sensor device including one or more sensors, e.g., accelerometers, equipped with processing circuit to perform a method as per the present disclosure may be exemplary of such a device.

One or more embodiments may relate to a corresponding computer program product.

One or more embodiments may relate to the method as a computer-implemented method.

One or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may involve a pipeline configured for processing time-series collected via one or more sensors, for instance via a triaxial accelerometer sensor.

One or more embodiments may be based on the observation that a specific transformation of a, e.g., of a 1D time domain signal may facilitate reducing the complexity of the system analysis, capturing its periodicity and confining it in an n-dimensional space in which a compact signature may be computed.

In one or more embodiments, processing such collected time-series may include applying a transform into a new coordinate system in which data collected may be easier to process and interpret, for instance in order to detect system malfunctioning and triggering an alert notification.

Specifically, one or more embodiments may facilitate generating a signature specific of a representative ensemble or cluster of states of the dynamical system which may be of interest to monitor.

One or more embodiments may facilitate obtaining a simpler representation of sensor data, for instance projecting point cloud data on planes and use such projections as input elements for analysis employing machine learning models.

In one or more embodiments, the signature may be a 1D or 2D data vector which may be plotted as a function or as a projection and analyzed. For instance, comparing processed sensor data with a known "well-functioning" signature, a malfunctioning may be detected, triggering an alert notification sub-system.

One or more embodiments envisage applying a series of transformations to project sensor data into a coordinate space wherein classification and anomaly detection may be more (computationally) straightforward.

In one or more embodiments, such a coordinate space facilitates representing specific states of a dynamical system using a characteristic signature (e.g., 1D or 2D vector), easy to interpret or process in analysis and classification stages. Such a solution may facilitate detecting and "extracting" characteristic signatures from recorded time-series of physical quantities of the dynamical system, such that further analysis can be carried on with a reduced amount of computational resources, for instance for classification and anomaly detection.

One or more embodiment may provide an alternative to classical Fast Fourier Transform (briefly, FFT) approaches.

One or more embodiments may be based on the observation that a dynamical system passes through a series of states that typically repeat periodically, hence a distinctive signature that encompasses and embeds the spatiotemporal behavior of the system may be generated.

One or more embodiments may facilitate, for instance, classifying human activity from time-series recorded by a "wearable" sensor, facilitating to monitor whether a person is in a steady condition, or walking, running, going up and down the stairs, biking, driving, and so on.

One or more embodiments may be applied to facilitate gesture recognition, facilitating to characterize the shape of specific user gestures (for instance, up, down, gym gestures, etc.)

One or more embodiments may be applied to one or more motors, facilitating recording normal behavior of a motor, as well as detecting anomalies.

The claims are an integral part of the technical teaching provided herein with reference to the embodiments.

BRIEF DESCRIPTION OF THE DRAWINGS

One or more embodiments will now be described, by way of non-limiting example only, with reference to the annexed Figures, wherein:

FIGS. 2 and 2A are exemplary diagrams of a method as per the present disclosure, FIGS. 2B and 2C are exemplary diagrams of portions of a method of FIG. 2, FIGS. 3 and 4 are exemplary diagrams of dictionaries of signatures of various dynamical systems obtained with the method as per the present disclosure.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

Figure 1:
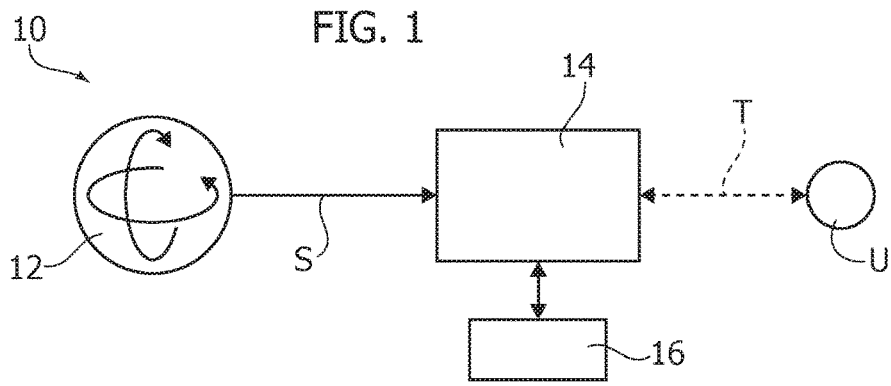
FIG. 1 is an exemplary diagram of a device as per the present disclosure.

One or more embodiments as exemplified in FIG. 1 may comprise a device 10 including:

at least one sensor 12, configured to record time-series S of data indicative of a state of a dynamical system, for instance an inertial sensor configured to record acceleration as an indicator of system motion, a processing circuit 14, for instance an STM32 microcontroller unit, coupled to the at least one sensor 12 and configured to process the recorded time-series S to extract one or more dynamical system signatures therefrom, wherein processing may comprise artificial neural network processing, and a (non-volatile) memory circuit block 16, coupled to the processing circuit 14 and configured to store the signatures, wherein the signatures may be used to train the artificial neural network machine learning model.

In one or more embodiments, the device may be equipped with networking means (e.g., cables, antennas, modem/router Internet, etc.) configured to trigger transmission of message signals T. For instance, alerting messages may be transmitted via such networking means to a user or controller U of the dynamical system if a malfunctioning state of the dynamical system is detected.

For the sake of simplicity, in the following principles underlying one or more embodiments may be discussed mainly with respect to an accelerometer sensor 12, being otherwise understood that such a sensor type and number of sensors is purely exemplary and in no way limiting. A plurality of sensors and sensor types may be used, in particular inertial sensors such as pressure sensors, gyroscopes, etc.

In general, a state of a dynamical system "exists" within some manifold M including and evolves (for instance, in time) according to some unknown function cp. Thus, state evolution dynamics is observed, for instance in values $x_1, \ldots, x_n$ in a set of real numeric values $\mathbb{R}$, by some observation (measurement) function g.

As mentioned, the accelerometer sensor 12 may provide a set of time-series S as system state measurement, for instance a set of three time series $a_x$, $a_y$, $a_z$, wherein each time series is indicative of acceleration on an axis in a Cartesian 3D coordinate system.

In general, the sensed signal S may be modeled as a vector belonging to a vector space $\mathbb{R}^D$, e.g., $S \in \mathbb{R}^D$.

For instance, such time-series may be sensed by the tri-axial accelerometer 12 when the sensor is coupled to an object in motion with variable acceleration as, e.g., a watch carried onto a person wrist during the day or a vibrating portion of a motor.

In the example considered, hence, a relation between measured data and the state of the dynamical system being observed may be expressed as:

$$(a_x, a_y, a_z) = g(x_n)$$

where both the observation function g and values $x_n$ are unknown.

For the sake of simplicity, few exemplary conditions are assumed in the following, wherein:

the system observed may be modeled as evolving with a certain time periodicity, we consider the accelerometer sensor signal S as comprising one time-series, e.g., horizontal axis acceleration measurement time-series $S = a_x$ the time-series may be expressed as a vector or entry having a number n of (data) samples or items, e.g., n=10 data which may be exemplified as, for instance:

$$S = a_x = \begin{pmatrix} a_x(1) \\ a_x(2) \\ a_x(3) \\ a_x(4) \\ a_x(5) \\ a_x(6) \\ a_x(7) \\ a_x(8) \\ a_x(9) \\ a_x(10) \end{pmatrix}$$

Once again, such a scenario is purely exemplary and in no way limiting.

One or more embodiments comprise a method 20 of processing such time-series S, the method including:
- high-pass filtering 200 the time-series S, producing a filtered time-series SF having an offset or DC component removed from the sensed dynamical system acceleration values in the time-series S; for the sake of simplicity, in the example considered we assume no offset is present in the acceleration data hence SF=S;
- applying delay embedding(s) 202 to the filtered time-series SF, comprising:
  i) providing a number of dimensions parameter value m and a delay parameter value $\Delta t$, wherein the number of dimensions parameter value may be, e.g., a positive integer equal to or greater than four m≥4, in order to facilitate signature extraction processing as discussed in the following;
  ii) producing a quantity of time-shifted replicas of the filtered time-series SF, such quantity being equal to the number of dimensions parameter value (m−1), so that the i-th replica in the (m−1) replicas is time-delayed with respect to the filtered time-series SF by a (integer) multiple of the delay parameter value(s) $\Delta t$.

In one or more embodiments, time-shifting a replica to obtain a time-shifted replica of the filtered time-series SF may comprise:
- selecting as first element of the replicated time-series the i-th element of the original filtered time-series SF,
- dropping data points of the time-series before the selected first element,
- filling up with any number the places left at the end of the time-series replica.

For instance, if $\Delta t=1$ and m=4, a quantity of three replicas may be generated, wherein, considering the exemplary numeric values for the time-series S discussed in the foregoing, it follows that a first (time-shifted) replica $S\Delta t$ may be expressed as:

$$S \cdot \Delta t = \begin{pmatrix} a_x(2) \\ a_x(3) \\ a_x(4) \\ a_x(5) \\ a_x(6) \\ a_x(7) \\ a_x(8) \\ a_x(9) \\ a_x(10) \\ 0 \end{pmatrix}$$

a second replica $S2\Delta t$ may be expressed as:

$$S \cdot 2\Delta t = \begin{pmatrix} a_x(3) \\ a_x(4) \\ a_x(5) \\ a_x(6) \\ a_x(7) \\ a_x(8) \\ a_x(9) \\ a_x(10) \\ 0 \\ 0 \end{pmatrix}$$

and a third replica $S3\Delta t$ may be expressed as:

$$S \cdot 3\Delta t = \begin{pmatrix} a_x(4) \\ a_x(5) \\ a_x(6) \\ a_x(7) \\ a_x(8) \\ a_x(9) \\ a_x(10) \\ 0 \\ 0 \\ 0 \end{pmatrix}$$

In one or more embodiments, applying delay embedding(s) 202 to the filtered time-series SF may further comprise:
iii) generating a delay matrix MX by stacking the time-shifted replicas $S\Delta t$, $S2\Delta t$, $S3\Delta t$ of the filtered time-series SF as entries of the delay matrix MX, e.g., column-wise. For instance, in the considered example of the time-series S=SF wherein n=10, m=4 and $\Delta t=1$, then the delay matrix MX may have size (n, m) and may be expressed as:

$$MX = (S, S \cdot \Delta t, S \cdot 2\Delta t, S \cdot 3\Delta t) = \begin{pmatrix} a_x(1) & a_x(2) & a_x(3) & a_x(4) \\ a_x(2) & a_x(3) & a_x(4) & a_x(5) \\ a_x(3) & a_x(4) & a_x(5) & a_x(6) \\ a_x(4) & a_x(5) & a_x(6) & a_x(7) \\ a_x(5) & a_x(6) & a_x(7) & a_x(8) \\ a_x(6) & a_x(7) & a_x(8) & a_x(9) \\ a_x(7) & a_x(8) & a_x(9) & a_x(10) \\ a_x(8) & a_x(9) & a_x(10) & 0 \\ a_x(9) & a_x(10) & 0 & 0 \\ a_x(10) & 0 & 0 & 0 \end{pmatrix}$$

The generated delay matrix MX may, in general, may be modeled as a vector belonging to a vector space $\mathbb{R}^{n \times m}$, e.g., $MX \in \mathbb{R}^{n \times m}$.

It may be observed that the ordered sequence of column entries of the delay matrix MX represents one of the dimensions of a certain multidimensional manifold indicative of the dynamical system evolution. Specifically, the delay matrix MX may be indicative of an m-dimensional point cloud having coordinates given by items of the matrix.

In one or more embodiments, the method 20 may comprise generating a truncated delay matrix MC by truncating 203 items from the delay matrix MX, for instance "chopping" the matrix MX row-wise, producing a truncated delay matrix MC as a result, the truncated matrix MC having size (n−H, m) wherein n−H represents the length at which delay matrix entries may be cut to, wherein a number H of items to remove from the delay matrix MX which may be expressed as H=Δt*(m−1).

In general, the truncated matrix MC may be modeled as a vector belonging to a vector space $\mathbb{R}^{(n-H) \times m}$, e.g., MC ∈ $\mathbb{R}^{(n-H) \times m}$.

In one or more embodiments, truncating 203 the delay matrix MX facilitate removing spurious or redundant items with respect to items at the top of the first matrix. Specifically, items comprising data generated during the time-shifting operation as a "filler" or "dummy" data values, with respect to that which is already present in the first n−H=Δt*(m−1) items of the first stacked entry S in the list of entries of the delay matrix MX, may be removed.

For instance, in the example considered the parameter H=3, hence the produced truncated delay matrix MC may be expressed as:

$$MC = \begin{pmatrix} a_x(1) & a_x(2) & a_x(3) & a_x(4) \\ a_x(2) & a_x(3) & a_x(4) & a_x(5) \\ a_x(3) & a_x(4) & a_x(5) & a_x(6) \\ a_x(4) & a_x(5) & a_x(6) & a_x(7) \\ a_x(5) & a_x(6) & a_x(7) & a_x(8) \\ a_x(6) & a_x(7) & a_x(8) & a_x(9) \\ a_x(7) & a_x(8) & a_x(9) & a_x(10) \end{pmatrix}$$

In one or more embodiments, the method 20 may comprise selecting 21 at least one signature extraction processing pipeline among:
   a first signature extraction processing pipeline 211, 212, configured to process the truncated matrix so as to obtain a set of signature images I, and/or
   a second signature extraction processing pipeline 204, 206, 208, 210, configured to process the truncated matrix so as to obtain a set of signature curves VS.

Figure 2:
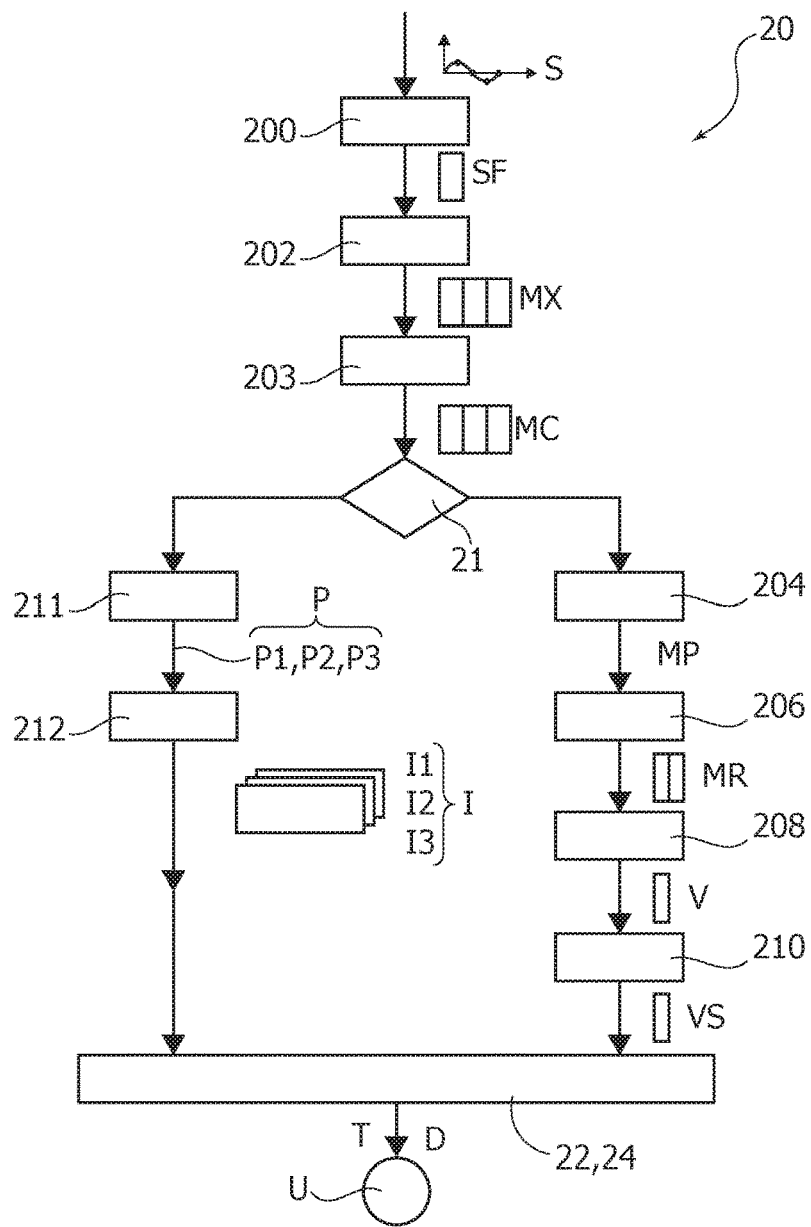
Figure 2B:
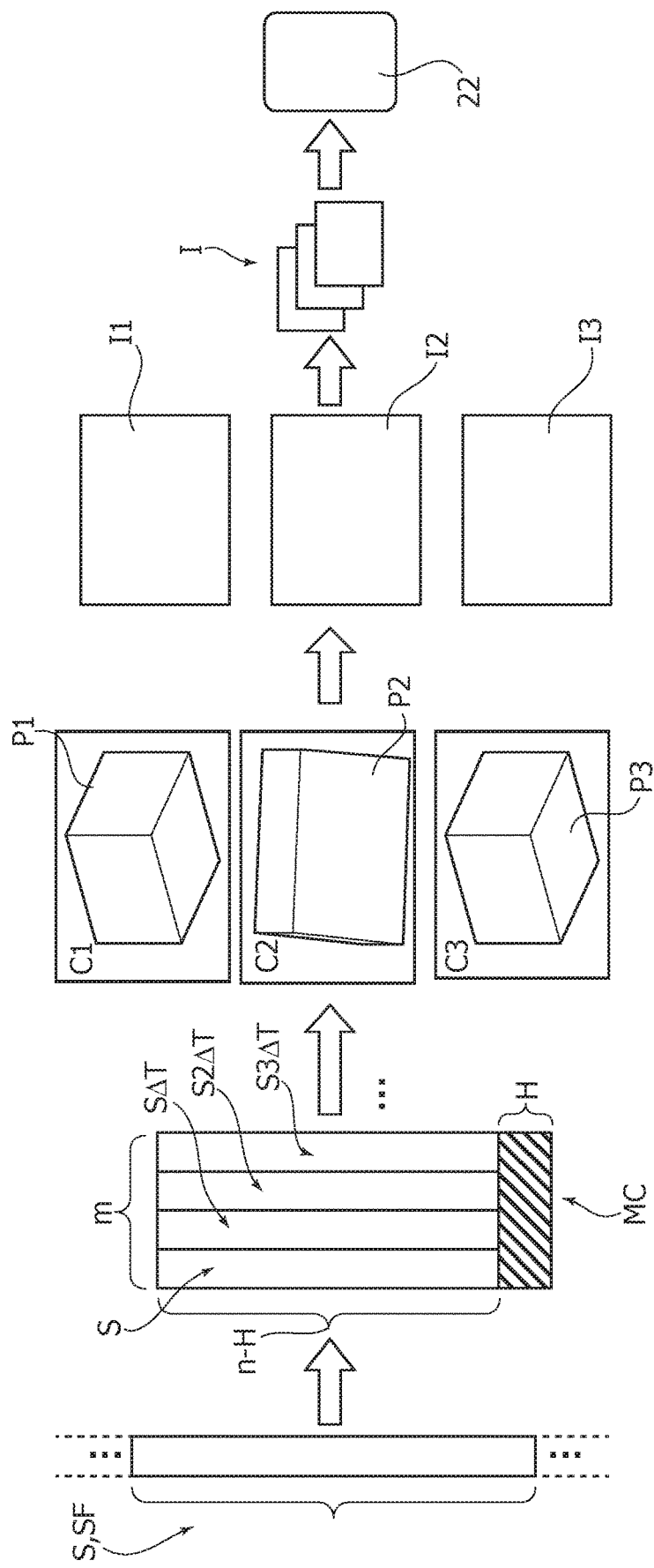

In one or more embodiments as exemplified in FIGS. 2 and 2B, the first pipeline 211, 212 may comprise:
   applying entry-wise processing 211 to the truncated matrix MC in order to obtain a set P of (m−1) geometrical projections, for instance comprising three geometrical projections P1, P2, P3, facilitating analysis of the dynamical system components,
   generating 212 a set of images of a system signature I, for instance comprising three images I1, I2, I3, as a function of the set of (m−1) projections P.

In one or more embodiments, the set of images of a system signature I may be provided to a user circuit such as a classification processing stage 22, wherein classification processing may comprise artificial neural network processing.

In one or more embodiments, the classification processing stage 22 may be configured to trigger alert signal transmission to a (further) user circuit U as a function of the output of the classification processing stage 22 being indicative of a certain detect state or malfunctioning.

In one or more embodiments, applying entry-wise processing 211 in order to the truncated matrix MC in order to obtain a set of (m-1) projections P may comprise applying mapping processing, preferably 2D mapping projecting so as to project the data onto delay-coordinate planes, as well as applying quantization processing to the projected data to in order to obtain numerical projection values P1, P2, P3.

Specifically, mapping processing may comprise pairing the entry of the truncated matrix MC generated by chopping the original time series entry S,SF, with other entries of the truncated matrix MC generated as a function of time-shifted replicas of the time-series data entry S,SF, obtaining a set of coordinate values.

In one or more embodiments, a set of projections P may be obtained by applying 2D bi-variate histogram processing to the coordinate values in the set of coordinates.

For instance, considering the exemplary truncated matrix MC generated as a function of parameters m=4, n=10, Δt=1, and indicating a i-th entry in the matrix MC as MC(i):
   first coordinate values C1 in the set of generated coordinate values may be obtained by pairing the first and second entries in the truncated matrix MC, C1=(MC(1), MC(2));
   second coordinate values C2 in the set of generated coordinate values may be obtained by pairing the first and third entries in the truncated matrix MC, C2=(MC(1), MC(3));
   third coordinate values C3 may be obtained by pairing the first and fourth entries in the truncated matrix MC, $C_3$=(MC(1), MC(4)).

For instance, in order to obtain numerical projection values, applying quantization processing to the paired entries data may comprise applying bivariate histogram processing, generating projections P1, P2, P3 in the set of projections P as a function of a bivariate histogram operator b, wherein:
   a first projection P1 may be generated applying bivariate histogram processing to the first coordinate values C1, which may be expressed as P1=b(C1),
   a second projection P2 may be generated applying bivariate histogram processing to the second coordinate values C2, which may be expressed as P2=b(C2),
   a third projection P3 may be generated applying bivariate histogram processing to the third coordinate values C3, which may be expressed as P3=b(C3).

Such a processing 211 may facilitate overcoming a limitation which may be present in conventional delay-embedding processing, wherein projections onto the main canonical planes may create redundant information as projections on the plane (x,y) and (y,z) generate point clouds alike, creating redundant and superfluous information.

In one or more embodiments, generating 212 a set of images of a system signature I as a function of the set of projections P may comprise using the (normalized) bins of the first P1, second P2, and third P3 bivariate histograms as pixel-values to create respective first I1, second I2 and third I3 dynamical system signature images. A histogram can be thought of as a simplistic kernel density estimation, which uses a kernel to smooth frequencies over the bins.

As mentioned, such images may be provided to a classifier processing stage 22 which may comprise artificial neural network processing. Specifically, Convolutional Neural Network (CNN) processing may be suitable for use to analyze the generated set of dynamical system signature images I.

In one or more embodiments, applying such a processing pipeline 211, 212 may be particularly advantageous in case a number of dimensions parameter value m=4 is selected, since three images may be obtained starting from one time series and such images may be used together associating to each image a specific color, for instance forming an RGB triplet facilitating to enhance CNN 22 pattern recognition.

FIG. 2B is a diagram exemplary of a portion of the processing pipeline 20, in particular of the first processing pipeline portion of FIG. 2. In FIG. 2B like-references are used to indicate like elements to FIG. 2.

In one or more embodiments, such pipelines 211, 212; 204, 206, 208, 210 may be used together or in alternative in a flexible way, in order to facilitate optimal management of computational resources, for instance in the processing circuit 14. For instance, as long as the size (n–H, m) of the truncated matrix MC is limited, it may be convenient to apply both pipelines thereto, while for a truncated matrix MC having a very high number of dimensions, the first 2D signature extraction processing pipeline 211, 212 may become too much computationally expensive.

Specifically, when the number of dimensions parameter m increases, it may be convenient to use principal component analysis (briefly, PCA) in place of projections.

In one or more embodiments as exemplified in FIGS. 2 and 2C, the second pipeline 204, 206, 208, 210 may comprise:
  applying entry-wise processing 204 to the truncated matrix MC in order to obtain a modified matrix MP as a result, wherein entry-wise processing 204 may comprise applying
  Principal Component Analysis (briefly, PCA) to the truncated matrix MC, for instance applying PCA(MC), so as to facilitate keeping consistent measurements in time.

Principal component analysis (PCA) is a kind of mapping or projection method wherein an orthogonal transformation is used to convert a set of observations of possibly correlated variables (entities each of which takes on various numerical values) into a set of values of linearly uncorrelated variables called principal components. For instance, this transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors (each being a linear combination of the variables and containing n observations) are an uncorrelated orthogonal basis set.

In one or more embodiments, applying PCA to the truncated matrix MC may produce, in a way per se known, a "scores" matrix MP, which may be expressed as a product of the truncated matrix MC times a "loadings" matrix W, e.g., MP=MC*W. In general, the "scores" matrix MP may maintain the size of the truncated matrix MC and may be modeled as belonging to an alike vector space $\mathbb{R}^{(n-H) \times m}$, e.g., MP $\in \mathbb{R}^{(n-H) \times m}$.

In one or more embodiments, the produced scores matrix MP may represent the projection of the original data onto the space identified by the principal components.

In one or more embodiments, the second pipeline may include further processing the modified matrix MP resulting from PCA application 204, wherein such further processing may include:
  a) analyzing the data projected onto the principal components space, for instance to estimate a variance of the columns,
  b) selecting a parametric number k of principal components or entries to maintain or to suppress, for instance by choosing a suitable amount of matrix columns (or dimensions) as a function of a calculated variance; specifically, k may be chosen as the number columns that explain most of the variance, wherein the total variance is the sum of variances of all individual principal components and the fraction of variance explained by a principal component is the ratio between the variance of that principal component and the total variance, for instance as discussed in document https://ro-che.info/articles/2017-12-11-pca-explained-variance;
  c) truncate the column entries of the modified matrix MP having the least significant components as a function of the chosen parameter k, truncating items in the matrix MP accordingly by cutting its last k entries therefrom, providing a truncated matrix having size (n–H, m–k),
  d) applying entry-wise, e.g., column-wise, resampling (for instance, down-sampling) to such a truncated matrix having size (n-H, m–k), in a way per se known, reducing it to a "standard" dimension (L, m–k) and producing a resampled or normalized matrix MR as a result, wherein resampling may comprise resampling the "scores" 206 of the matrix MP in order to filter out the less significant data in the principal components space, estimating the precision of sample statistics (median, variance, etc.).

In general, the resampled matrix MR may be modeled as belonging to a vector space $\mathbb{R}^{L \times (m-k)}$ with the parameter L≤(n–H), e.g., MR $\in \mathbb{R}^{L \times (m-k)}$, L≤(n–H).

In one or more embodiments, column-wise resampling may advantageously be applied in the case wherein the size of the time-series S is such to comprise a large number of values in the columns of the delay matrix, for example from the order of tens, e.g., 128, to the order thousands of elements. Such a resampling (or down-sampling) operation may be particularly advantageous in cases the inertial data sampled by the sensor 12 is acquired at a very high sampling rate.

It is noted that resampling may compress the data, so it may be useful to verify that resampling does not generate problems in the generated signatures because of excessive data compression.

Specifically, resampling (or subsampling) may preferably be performed with an integer number value (e.g., 2, 3, . . . ) so as to avoid non-integer subsampling which may use applying computationally burdensome anti-aliasing techniques.

In one or more embodiments, the second pipeline may further comprise computing 208 an entry-wise, e.g., column-wise, norm vector NV of the resampled matrix MR and a so-called flip vector FV as a function of the items, e.g., rows, of the resampled matrix MR, producing a set of vectors V=(NV,FV). For instance:
  the row-wise flip vector FV may be computed as the product of row-wise signs of the values in the matrix entries,
  the norm vector NV may be computed applying row-wise L2 norm computation to the resampled matrix MR entries.

In general, the flip vector FV as well as the norm vector NV may be expressed as members of a vector space $\mathbb{R}^{L \times 1}$, e.g., FV $\in \mathbb{R}^{L \times 1}$, NV $\in \mathbb{R}^{L \times 1}$.

In one or more embodiments, the second pipeline 204, 206, 208, 210 may comprise a signature computation stage 210 providing as a result a dynamical system signature VS, e.g., a 1D signature, the computation stage 210 comprising:
  applying Kernel Density Estimation (briefly, KDE) to a scalar product of the norm vector NV and the flip vector FV, producing a Kernel Density estimate vector VS indicative of the dynamical system state, and optionally, applying temporal filtering e.g., Temporal Leaky Integration in order to suppress residual noise in the estimated KDE to reduce residual statistical fluctuations in the vector VS.

In general, the dynamical system signature generated by applying KDE may be expressed as VS=KDE(FV⊙NV, 1),VS ∈ $\mathbb{R}^{l\times 1}$.

In one or more embodiments, the signature VS provided as a result of the second processing pipeline 204, 206, 208, 210 may be provided to a user circuit configured to perform classification processing 22, wherein classification processing may comprise artificial neural network processing 22 (e.g., CNN or other neural network models).

In one or more embodiments, the classification processing stage 22 may be configured to trigger alert signal transmission to a (further) user circuit U as a function of the output of the classification processing stage 22 being indicative of a certain detect state or malfunctioning.

In one or more embodiments, the second pipeline facilitates generating a signature VS having size (l, 1) which may be particularly advantageous wherein n»1 and m»1, as mentioned, since a great compaction may be obtained.

KDE is a non-parametric way to estimate the probability density function of a (random) variable, using data smoothing to perform inferences based on a finite data sample.

In one or more embodiments as exemplified in FIG. 2A, the method may include optional processing stages 20',20", 23.

For instance, optionally a parallel pipeline 20' including stages substantially equivalent to those discussed with respect to the pipeline 20 may be applied to another sensor data time-series component, e.g., the vertical acceleration component, of a triaxial accelerator sensor 12 sensed time-series S', so that in an optional processing stage 23:
- a first generated signature VS and a second generated signature VS' may be merged in a common "fused" signature VF, and/or
- a first generated set of images of system signatures I and a second generated set of images of system signatures I' may be merged in a common image signature IF and/or squashed into a 1D compact signature VF.

In particular, the second processing pipeline 204, 206, 208, 210 may be applied to each time series generated by the sensors, generating a number of k signatures VS, VS', VS", ..., VSk.

Considering, for instance, a tri-axial accelerometer, a set of three signatures VS, VS', VS" may be generated which may be merged according to a non-symmetric function which may be expressed as Γ(·), for instance so as to satisfy the following expression:

$$\Gamma(\rho_1(VS,VS',VS''))\neq\Gamma(\rho_2(VS,VS',VS''))$$

wherein $\rho_1$ and $\rho_2$ are two distinct random permutations of the signatures VS, VS', VS".

In one or more embodiments, the method may comprise a stage of collecting signatures of a dynamical system under analysis and producing a "dictionary", which may be stored in the memory circuit 16 and/or used to train the classification processing stage 22. The dictionary may include a set of different system signatures.

Depending on the particular dynamic state of the system, a different signature is generated for each of the different states that are being monitored.

For example, it may be of interest to monitor if a motor is running normally of if there are anomalies.

The dictionary of signatures may be collected, for instance:
- selecting a finite set of motor speed values,
- run the motor at each of those speeds, and
- generating a different signature for each of the system speeds.

For instance, in case an anomaly is developed inside the motor (e.g., unbalance), a first signature VS1 may be produced different from any other signature VSo generated when the system is unperturbed. The artificial neural network may detect such a different pattern and trigger an alert of malfunctioning as a result.

In one or more embodiments, the dictionary D produced 21 may be provided to an artificial neural network (briefly, ANN) processing stage 22, e.g., in order to train the ANN to label time-series sensed by the sensor 12 as one of the states in the dictionary of signatures D.

The dictionary of signatures D, for instance collecting signatures generated in the collecting phase as discussed in the foregoing, may be labelled (e.g., the label being indicative of the motor operative setup while being monitored), facilitating artificial neural network pattern recognition 22.

In one or more embodiments, the second pipeline may include analyzing 24 time-series using the dictionary of features D, comprising applying Dynamic Time Warping, briefly DTW, to the received time-series S sensed by the sensor 12.

In time series analysis, DTW is one of the methods which may be employed for measuring similarity between two temporal sequences, which may vary in speed. For instance, similarities in walking could be detected using DTW, even if one person was walking faster than the other, or if there were accelerations and decelerations during the course of an observation.

In general, DTW is a method that calculates an optimal match between two given sequences (e.g., time series) with certain parameters and rules, wherein the optimal match is denoted by the match that satisfies the parameters and the rules while having a minimal cost computed as the sum of absolute differences, for each matched pair of indices, between their values.

In order to find such a match, in DTW time-series may be "warped" non-linearly in the time dimension to determine a measure of their similarity independent of certain non-linear variations in the time dimension, providing a so called "warping path". Warping time-series according to this path, two time-series signals may be aligned in time. The signal with an original set of points X(original), Y(original) is transformed to X(warped), Y(warped).

In one or more embodiments, the dictionary of signatures D may include very specific (symmetric) signatures VS1, VSo of a specific length for any specific dynamical system behavior (perturbed, unperturbed, etc.).

FIG. 2C is a diagram exemplary of possible matrices and vectors which may be computed in a second pipeline processing as discussed in the foregoing. For the sake of simplicity like numerals and references are used.

Figure 3:
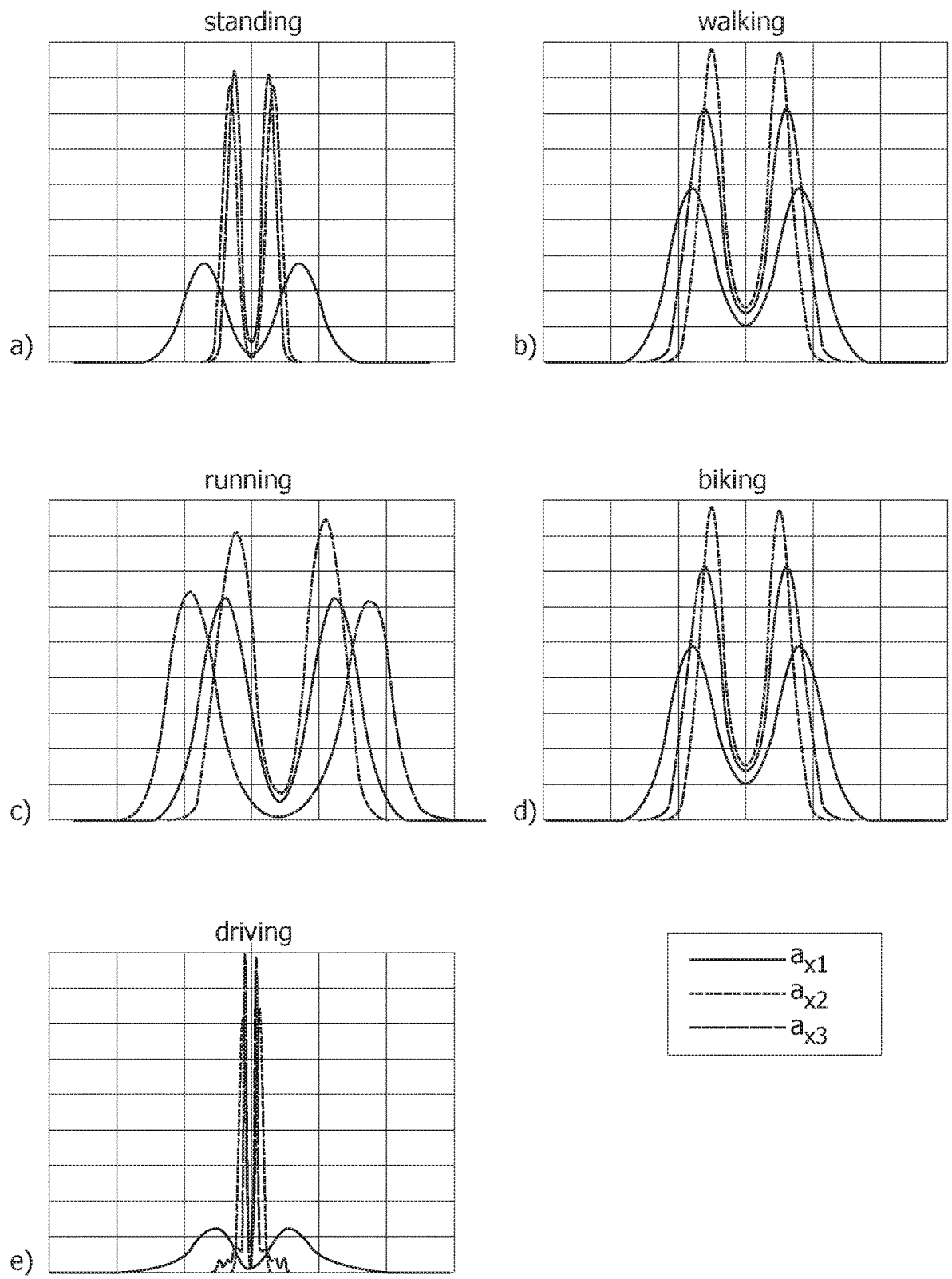

FIG. 3, including portions a) to e), is exemplary of signatures which may form a dictionary of signatures D. Such a dictionary D may be obtained by applying the data processing method 20, 21 as disclosed herein to the time-series S collected by the accelerometer 12 when coupled to an object which may be worn by a human in motion, recording time series of different human activities during the day. In one or more embodiments, signatures in the dictionary D may be hand-labeled with different state-labels (e.g., walking, standing, running, biking, driving as exemplified in FIG. 4) and then used to train a neural network circuit 14 to recognize activities automatically when fed with data from the sensor 12.

Figure 4:
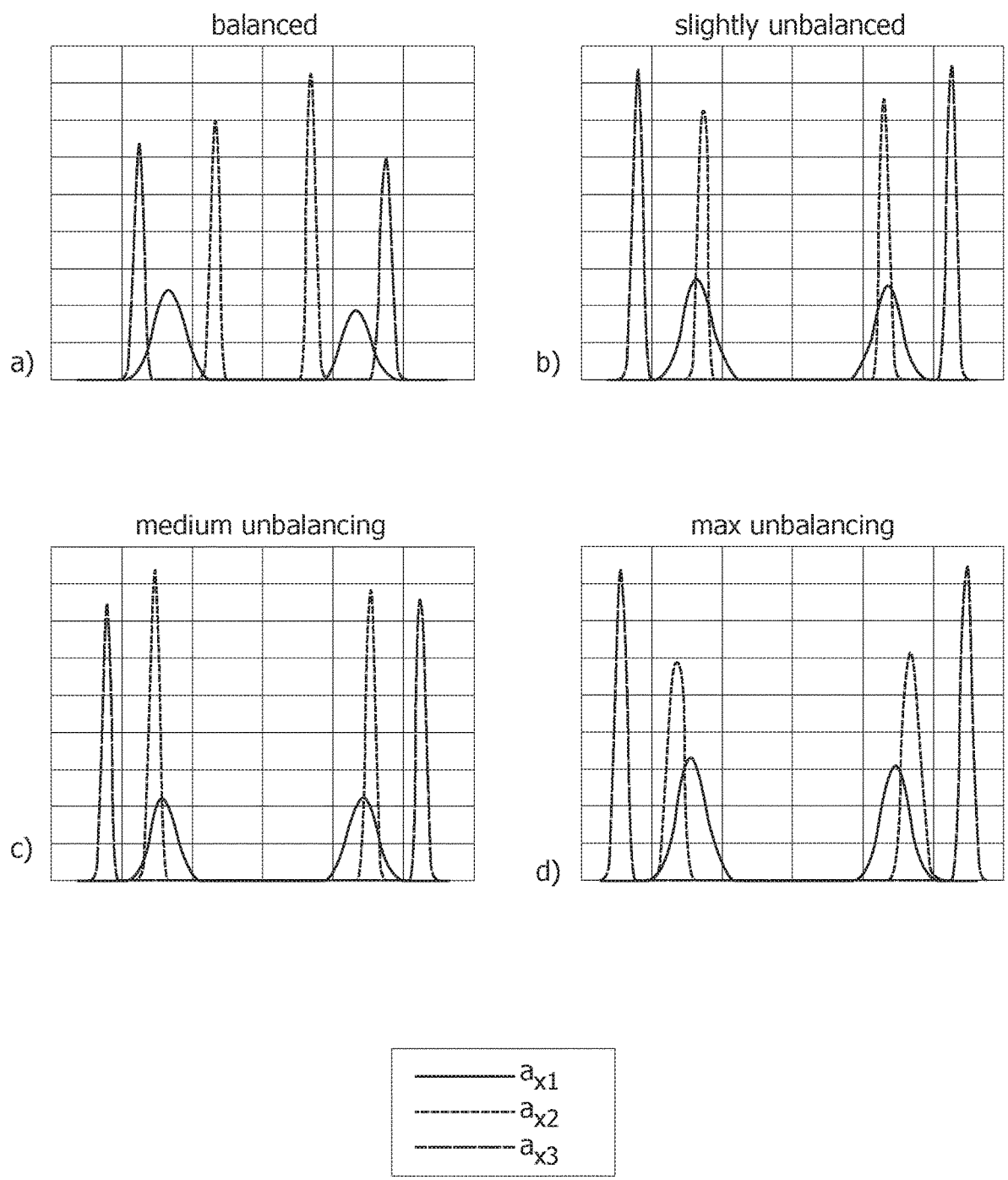

FIG. 4, including portions a) to d), is exemplary of a dictionary of signatures D' which may be obtained by applying the data processing method 20, 21 as disclosed herein to the time-series S collected by the accelerometer 12 when coupled to a motor in motion, recording motor vibrations. In one or more embodiments, signatures in the dictionary D may be hand-labeled with different state-labels (e.g., motor balanced, motor slightly unbalanced, motor medium unbalancing, motor max unbalancing, as exemplified in FIG. 4) and then used to train a neural network circuit 14 to recognize activities automatically when fed with data from the sensor 12.

It is noted that diagrams in FIG. 3 and in FIG. 4 scale ranges have substantially different range values.

As mentioned, in one or more embodiment operations of the method 20, 21, 22, 24 may be implemented on a processing circuit device 14, for instance on edge devices belonging to STM32 family products. Edge devices computing facilitates data analysis to be carried on without using transferring raw data by carrying out data cleaning, aggregation and analysis on the device itself, resulting in reduced bandwidth costs, quicker response times and reduced traffic.

In one or more embodiments, a classification label or the measure of a degree of similarity may be provided to a user circuit configured to trigger an alert in case the classification label is indicative of a malfunctioning state of the dynamical system or if the measure of degree of similarity exceeds a given threshold.

In one or more embodiments, a method of processing (for instance, 20) at least one sensing signal received from a sensor (for instance, 12) coupled to a dynamical system evolving over time, wherein the at least one sensing signal comprises a time-series of signal samples (for instance, S) may comprise:
  high-pass filtering (for instance, 200) the time series of signal samples to produce a filtered time series (for instance, SF) therefrom,
  applying delay embedding processing (for instance, 202) to the filtered time series, wherein the delay embedding processing comprises:
  i) providing a first delay embedding parameter (for instance, m) and a second delay embedding parameter, the first and second delay embedding parameters indicating a dimension for a matrix (for instance, MX) and a time delay, respectively,
  ii) producing a set of time-shifted time series of signal samples (for instance, SΔt S2Δt, S3Δt), the set of time-shifted time series including a number of time-shifted replicas of the filtered time series, the number equal to the matrix dimension indicated by the first delay embedding parameter decremented by one, the time-shifted replicas of the filtered time series being mutually shifted over time of a time-delay equal to the time delay indicated by the second delay embedding parameter,
  producing a first matrix (for instance, MX), wherein producing the first matrix comprises storing the set of time-shifted time series as an ordered list of entries in the first matrix,
  applying a first truncation to the first matrix (MX) to produce a second matrix (for instance, MC), wherein the first truncation comprises truncating the entries in the ordered list of entries at one end of the first matrix to remove a number (for instance, H) of items from the entries, the number equal to the product of the first delay embedding parameter decreased by one times the second delay embedding parameter,
  applying entry-wise processing (for instance, 21, 204, 211) to the second matrix, wherein applying entry-wise processing comprises selecting (for instance, 21) at least one processing pipeline (for instance, 211, 212; 204, 206, 208, 210) among a first processing pipeline (for instance, 211, 212) and a second processing pipeline (for instance, 204, 206, 208, 210, the at least one processing pipeline comprising performing (for instance, 210) Kernel Density Estimation, KDE, and providing a set of estimated kernel densities (for instance, VS) and/or a set of images (for instance, I) generated as a function of the set of estimated kernel densities, the set of estimated kernel densities and/or the set of images generated as a function of the set of estimated kernel densities being indicative of the state of the dynamical system, and
  forwarding the set of estimated kernel densities (for instance, VS) and/or the set of images (for instance, I) generated as a function of the set of estimated kernel densities to a user circuit (for instance, U).

In one or more embodiments, the first delay embedding parameter may be equal to or greater than four.

In one or more embodiments, applying entry-wise processing to the second matrix may comprise selecting a first processing pipeline (for instance, 211, 212) comprising:
  performing KDE (for instance, 211) on entries in the second matrix and obtaining a set of estimated kernel densities (for instance, P, P1, P2, P3) indicative of the state of the dynamical system as result, the performing KDE comprising:
  i) sequentially pairing a first entry (for instance, S) in a list of ordered entries of the second matrix (for instance, MC) to other entries in the list of ordered entries of the second matrix, obtaining a set of coordinate values (for instance, C1, C2, C3),
  ii) computing at least one estimated kernel density as a function of the set of coordinate values, and
  generating (for instance, 212) a set of images (for instance, I1, I2, I3, I) as a function of the set of estimated kernel densities indicative of the state of the dynamical system.

In one or more embodiments:
  computing the set of estimated kernel densities comprises computing the bivariate histogram of at least one coordinate value in the set of coordinate values as a function of a given histogram bin size, and
  generating the set of images as a function of the set of estimated kernel densities indicative of the state of the dynamical system comprises assigning respective pixel values to the numbers of data points in respective bins of the computed bivariate histograms, preferably grayscale or RGB pixel values.

In one or more embodiments, applying entry-wise processing (for instance, 204, 211) to the second matrix comprises selecting a second processing pipeline (for instance, 204, 206, 208, 210, 212) comprising:
  applying (for instance, 204) Principal Component Analysis, PCA, to the second matrix and producing a third matrix (for instance, MP) as a projection in the space of Principal Components, PCs, of the second matrix,
  applying resampling and a second truncation (for instance, 206) to the third matrix to produce a resampled truncated matrix (for instance, MR), wherein the resampling comprises resampling entry-wise (for instance, 206) the second matrix and the second truncation comprises removing from the third matrix a number of entries as a function of the variance of the entries of the third matrix;

computing (for instance, 208) an entry-wise norm vector (for instance, NV) and an entry-wise sign-vector (for instance, FV) of the resampled truncated matrix, and producing a vector (for instance, V) equal to a scalar product of the entry-wise norm vector times the entry-wise sign-vector;

performing (for instance, 210) Kernel Density Estimation, KDE, on the computed vector (for instance, V) to produce at least one estimated kernel density of the computed vector, wherein the at least one estimated kernel density (for instance, VS) is indicative of the state of the dynamical system.

In one or more embodiments:

producing the first matrix comprises storing the set of time-shifted time series as columns in the first matrix, the first truncation comprises truncating the columns of the first matrix to remove from the bottom of the first matrix a number (for instance, H) of rows equal to the product of the first delay embedding parameter, decremented by one, times the second delay embedding parameter, the resampling comprises resampling column-wise (for instance, 206) the second matrix and the second truncation comprises removing from the third matrix a number of columns as a function of the variance of the columns of the third matrix;

computing (for instance, 208) a column-wise norm vector (for instance, NV) and an entry-wise sign-vector (for instance, FV) of the resampled truncated matrix (for instance, MR), and producing a vector (for instance, V) equal to a scalar product of the entry-wise norm vector (for instance, NV) times the entry-wise sign-vector (for instance, FV).

One or more embodiments may comprise resampling the third matrix at a rate which is a multiple of the sample rate of the signal samples in the time-series of signal samples.

In one or more embodiments the second truncation may comprise:

calculating a set of variance values of entries of the third matrix;

calculating a total variance of the third matrix, calculating ratios of the respective calculated variance values of the entries of the third matrix and the calculated total variance of the third matrix, performing a comparison between the ratios, and selectively removing entries from the third matrix as a function of the outcome of the comparison.

One or more embodiments may comprise:

collecting (for instance, 216) a set of estimated kernel densities (for instance, I, I', I''; VS, VS', VS'') indicative of a set of states of the dynamical system, producing a dictionary (for instance, D) comprising the set of estimated kernel densities.

One or more embodiments may comprise forwarding the set of estimated kernel densities to an artificial neural network classifier (for instance, 22) to provide the artificial neural network classifier with a training set in recognizing dynamical states of the dynamical system.

One or more embodiments may comprise forwarding the set of estimated kernel densities (for instance, VS, VS', VS'') to a Dynamic Time Warping, DTW, processing stage (for instance, 24), the processing stage configured to apply Dynamic Time Warping processing to the at least one sensing signal received from the sensor and to the set of estimated kernel densities, to evaluate a distance therebetween.

In one or more embodiments, a method may comprise:

receiving at least two sensing signals (for instance, S, S', S'') from at least one sensor (for instance, 12) coupled to a dynamical system, wherein the at least two sensing signals (for instance, S, S', S'') may comprise respective time-series of signal samples, individually processing (20, 20',20'') the at least two sensing signals (S, S', S'') with the method of any of claims 1 to 11, wherein the operation of performing Kernel Density Estimation, KDE, (for instance, 211, 210) produces at least two respective estimated kernel densities (for instance, VS, VS', VS''; I, I', I''), merging (212) the respective estimated kernel densities (for instance, VS, VS', VS''; I, I', I'') to at least one fused density (for instance, VF, IF) indicative of the state of the dynamical system, and forwarding the fused density (for instance, VF, IF) to a user circuit (for instance, U).

One or more embodiments may comprise a processing system (for instance, 14, 16) configured to be coupled to a sensor (for instance, 12) to receive therefrom at least one sensing signal sensed at a dynamical system evolving over time, wherein the at least one sensing signal comprises a time-series of signal samples (for instance, S), the processing system configured to implement one or more embodiments of a method (for instance, 20) and/or 12 and generate at least one trigger signal (for instance, T) as a function of the at least one estimated kernel density (for instance, VS, I; IF, VS).

In one or more embodiments, a device (for instance, 10) may comprise:

a sensor (for instance, 12) configured to be coupled to a dynamical system evolving over time and to provide at least one sensing signal comprises a time-series of signal samples (for instance, S), and one or more embodiments of a processing system (for instance, 14) coupled to the sensor to receive therefrom the at least one sensing signal.

In one or more embodiments, the sensor may comprise at least one of a tri-axial accelerometer sensor, a pressure sensor, a gyroscope.

One or more embodiments may comprise a computer program product, loadable in at least one processing circuit (for instance, 14, 16), and comprising software code portion implementing one or more embodiments of a method when run on the processing circuit.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method of processing at least one sensing signal received from an inertial sensor coupled to a dynamical system evolving over time, wherein the at least one sensing signal comprises a time series of signal samples, the method comprising:

measuring the at least one sensing signal via the inertial sensor;

receiving the at least one sensing signal at a processing circuit coupled to the inertial sensor;

high-pass filtering the time series of signal samples via the processing circuit to produce a filtered time series therefrom;

applying delay embedding processing to the filtered time series via the processing circuit, wherein the delay embedding processing comprises:
  i) providing a first delay embedding parameter and a second delay embedding parameter, the first and second delay embedding parameters indicating a dimension for a matrix and a time delay, respectively; and
  ii) producing a set of time-shifted time series of signal samples, the set of time-shifted time series including a number of time-shifted replicas of the filtered time series, the number equal to the matrix dimension indicated by the first delay embedding parameter decremented by one, the time-shifted replicas of the filtered time series being mutually shifted over time of a time-delay equal to the time delay indicated by the second delay embedding parameter;

producing a first matrix, wherein producing the first matrix comprises storing the set of time-shifted time series in a memory circuit block coupled to the processing circuit as an ordered list of entries in the first matrix, applying a first truncation to the first matrix to produce a second matrix, wherein the first truncation comprises truncating the entries in the ordered list of entries at one end of the first matrix to remove a number of items from the entries, the number equal to a product of the first delay embedding parameter decreased by one times the second delay embedding parameter;

applying entry-wise processing to the second matrix, wherein applying entry-wise processing comprises selecting at least one processing pipeline among a first processing pipeline and a second processing pipeline, the at least one processing pipeline comprising performing Kernel Density Estimation (KDE), and providing a set of estimated kernel densities and/or a set of images generated as a function of the set of estimated kernel densities, the set of estimated kernel densities and/or the set of images generated as a function of the set of estimated kernel densities being indicative of a state of the dynamical system;

forwarding the set of estimated kernel densities and/or the set of images generated as a function of the set of estimated kernel densities to a user circuit, and performing classification processing via the user circuit.

2. The method of claim 1, wherein the first delay embedding parameter is equal to or greater than four.

3. The method of claim 1, wherein applying entry-wise processing to the second matrix comprises selecting a first processing pipeline, the first processing pipeline comprising:
  performing KDE on entries in the second matrix and obtaining a set of estimated kernel densities indicative of the state of the dynamical system as result, the performing KDE comprising:
    i) sequentially pairing a first entry in a list of ordered entries of the second matrix to other entries in the list of ordered entries of the second matrix, obtaining a set of coordinate values; and
    ii) computing at least one estimated kernel density as a function of the set of coordinate values; and
  generating a set of images as a function of the set of estimated kernel densities indicative of the state of the dynamical system.

4. The method of claim 3, wherein:
computing the set of estimated kernel densities comprises computing a bivariate histogram of at least one coordinate value in the set of coordinate values as a function of a given histogram bin size; and
generating the set of images as a function of the set of estimated kernel densities indicative of the state of the dynamical system comprises assigning respective pixel values to numbers of data points in respective bins of the computed bivariate histogram, preferably grayscale or red-green-blue (RGB) pixel values.

5. The method of claim 1, wherein applying entry-wise processing to the second matrix comprises selecting a second processing pipeline, the second processing pipeline comprising:
  applying Principal Component Analysis (PCA) to the second matrix and producing a third matrix as a projection in a space of Principal Components of the second matrix;
  applying resampling and a second truncation to the third matrix to produce a resampled truncated matrix, wherein the resampling comprises resampling entry-wise the second matrix and the second truncation comprises removing from the third matrix a number of entries as a function of a variance of the entries of the third matrix;
  computing an entry-wise norm vector and an entry-wise sign-vector of the resampled truncated matrix, and producing a vector equal to a scalar product of the entry-wise norm vector times the entry-wise sign-vector; and
  performing KDE on the produced vector to produce at least one estimated kernel density of the produced vector, wherein the at least one estimated kernel density is indicative of the state of the dynamical system.

6. The method of claim 5, wherein:
producing the first matrix comprises storing the set of time-shifted time series as columns in the first matrix; and
the first truncation comprises truncating the columns of the first matrix to remove from a bottom of the first matrix a number of rows equal to the product of the first delay embedding parameter, decremented by one, times the second delay embedding parameter;
the resampling comprises resampling column-wise the second matrix and the second truncation comprises removing from the third matrix a number of columns as a function of a variance of the columns of the third matrix; and
computing a column-wise norm vector and an entry-wise sign-vector of the resampled truncated matrix, and producing a vector equal to the scalar product of the entry-wise norm vector times the entry-wise sign-vector.

7. The method of claim 5, comprising resampling the third matrix at a rate which is a multiple of a sample rate of the signal samples in the time series of signal samples.

8. The method of claim 5, wherein the second truncation comprises:

calculating a set of variance values of entries of the third matrix;
calculating a total variance of the third matrix;
calculating ratios of the respective calculated variance values of the entries of the third matrix and the calculated total variance of the third matrix;
performing a comparison between the ratios; and
selectively removing entries from the third matrix as a function of an outcome of the comparison.

9. The method of claim 1, further comprising:
collecting a set of estimated kernel densities indicative of a set of states of the dynamical system; and
producing a dictionary comprising the set of estimated kernel densities.

10. The method of claim 9, further comprising forwarding the set of estimated kernel densities to a Dynamic Time Warping (DTW) processing stage configured to apply DTW processing to the at least one sensing signal received from the sensor and to the set of estimated kernel densities, to evaluate a distance therebetween.

11. The method of claim 1, further comprising forwarding the set of estimated kernel densities to an artificial neural network classifier to provide the artificial neural network classifier with a training set in recognizing dynamical states of the dynamical system.

12. The method of claim 1, the at least one sensing signal comprising at least two sensing signals, and the method further comprising:
receiving the at least two sensing signals from at least one sensor coupled to the dynamical system, the at least two sensing signals comprising respective time series of signal samples;
individually performing, for each of the at least two sensing signals, the high-pass filtering, the applying delay embedding processing, the producing the first matrix, the applying the first truncation to the first matrix, and the applying entry-wise processing to the second matrix;
the performing KDE producing at least two respective estimated kernel densities;
merging the respective estimated kernel densities into at least one fused density indicative of the state of the dynamical system; and
forwarding the fused density to the user circuit.

13. A device comprising:
a processing system configured to receive at least one sensing signal sensed at a dynamical system evolving over time, wherein the at least one sensing signal comprises a time series of signal samples, and wherein the processing system is configured to implement a method of processing the at least one sensing signal, the method comprising:
measuring the at least one sensing signal via an inertial sensor;
receiving the at least one sensing signal at a processing circuit coupled to the inertial sensor;
high-pass filtering the time series of signal samples via the processing circuit to produce a filtered time series therefrom;
applying delay embedding processing to the filtered time series via the processing circuit, wherein the delay embedding processing comprises:
i) providing a first delay embedding parameter and a second delay embedding parameter, the first and second delay embedding parameters indicating a dimension for a matrix and a time delay, respectively; and
ii) producing a set of time-shifted time series of signal samples, the set of time-shifted time series including a number of time-shifted replicas of the filtered time series, the number equal to the matrix dimension indicated by the first delay embedding parameter decremented by one, the time-shifted replicas of the filtered time series being mutually shifted over time of a time-delay equal to the time delay indicated by the second delay embedding parameter;
producing a first matrix, wherein producing the first matrix comprises storing the set of time-shifted time series in a memory circuit block coupled to the processing circuit as an ordered list of entries in the first matrix,
applying a first truncation to the first matrix to produce a second matrix, wherein the first truncation comprises truncating the entries in the ordered list of entries at one end of the first matrix to remove a number of items from the entries, the number equal to a product of the first delay embedding parameter decreased by one times the second delay embedding parameter;
applying entry-wise processing to the second matrix, wherein applying entry-wise processing comprises selecting at least one processing pipeline among a first processing pipeline and a second processing pipeline, the at least one processing pipeline comprising performing Kernel Density Estimation (KDE), and providing a set of estimated kernel densities and/or a set of images generated as a function of the set of estimated kernel densities, the set of estimated kernel densities and/or the set of images generated as a function of the set of estimated kernel densities being indicative of a state of the dynamical system; and
forwarding the set of estimated kernel densities and/or the set of images generated as a function of the set of estimated kernel densities to a user circuit, wherein the user circuit generates at least one trigger signal as a function of the at least one estimated kernel density.

14. The device of claim 13, further comprising:
a sensor coupled to the processing system, wherein the sensor is configured to be coupled to a dynamical system evolving over time, and wherein the sensor is configured to provide the at least one sensing signal comprising the time series of signal samples to the processing system.

15. The device of claim 14, wherein the sensor comprises at least one of: a tri-axial accelerometer sensor, a pressure sensor, or a gyroscope.

16. The device of claim 13, wherein the first delay embedding parameter is equal to or greater than four.

17. The device of claim 13, wherein applying entry-wise processing to the second matrix comprises selecting a first processing pipeline, the first processing pipeline comprising:
performing KDE on entries in the second matrix and obtaining a set of estimated kernel densities indicative of the state of the dynamical system as result, the performing KDE comprising:
i) sequentially pairing a first entry in a list of ordered entries of the second matrix to other entries in the list of ordered entries of the second matrix, obtaining a set of coordinate values; and
ii) computing at least one estimated kernel density as a function of the set of coordinate values; and generating a set of images as a function of the set of estimated kernel densities indicative of the state of the dynamical system.

18. The device of claim 13, wherein applying entry-wise processing to the second matrix comprises selecting a second processing pipeline, the second processing pipeline comprising:
applying Principal Component Analysis (PCA) to the second matrix and producing a third matrix as a projection in a space of Principal Components of the second matrix;
applying resampling and a second truncation to the third matrix to produce a resampled truncated matrix, wherein the resampling comprises resampling entry-wise the second matrix and the second truncation comprises removing from the third matrix a number of entries as a function of a variance of the entries of the third matrix;
computing an entry-wise norm vector and an entry-wise sign-vector of the resampled truncated matrix, and producing a vector equal to a scalar product of the entry-wise norm vector times the entry-wise sign-vector; and
performing KDE on the produced vector to produce at least one estimated kernel density of the produced vector, wherein the at least one estimated kernel density is indicative of the state of the dynamical system.

19. The device of claim 13, wherein the method further comprises:
collecting a set of estimated kernel densities indicative of a set of states of the dynamical system; and
producing a dictionary comprising the set of estimated kernel densities.

20. A non-transitory computer program product, loaded in at least one processing circuit, and comprising a software code portion that, when run on the processing circuit, implements a method of processing at least one sensing signal received from an inertial sensor coupled to a dynamical system evolving over time, wherein the at least one sensing signal comprises a time series of signal samples, the method comprising:
measuring the at least one sensing signal via the inertial sensor;
receiving the at least one sensing signal at a processing circuit coupled to the inertial sensor;
high-pass filtering the time series of signal samples via the processing circuit to produce a filtered time series therefrom;
applying delay embedding processing to the filtered time series via the processing circuit, wherein the delay embedding processing comprises:
i) providing a first delay embedding parameter and a second delay embedding parameter, the first and second delay embedding parameters indicating a dimension for a matrix and a time delay, respectively; and
ii) producing a set of time-shifted time series of signal samples, the set of time-shifted time series including a number of time-shifted replicas of the filtered time series, the number equal to the matrix dimension indicated by the first delay embedding parameter decremented by one, the time-shifted replicas of the filtered time series being mutually shifted over time of a time-delay equal to the time delay indicated by the second delay embedding parameter;
producing a first matrix, wherein producing the first matrix comprises storing the set of time-shifted time series in a memory circuit block coupled to the processing circuit as an ordered list of entries in the first matrix,
applying a first truncation to the first matrix to produce a second matrix, wherein the first truncation comprises truncating the entries in the ordered list of entries at one end of the first matrix to remove a number of items from the entries, the number equal to a product of the first delay embedding parameter decreased by one times the second delay embedding parameter;
applying entry-wise processing to the second matrix, wherein applying entry-wise processing comprises selecting at least one processing pipeline among a first processing pipeline and a second processing pipeline, the at least one processing pipeline comprising performing Kernel Density Estimation (KDE), and providing a set of estimated kernel densities and/or a set of images generated as a function of the set of estimated kernel densities, the set of estimated kernel densities and/or the set of images generated as a function of the set of estimated kernel densities being indicative of a state of the dynamical system;
forwarding the set of estimated kernel densities and/or the set of images generated as a function of the set of estimated kernel densities to a user circuit, and
performing classification processing via the user circuit.

* * * * *